UNITED STATES PATENT OFFICE.

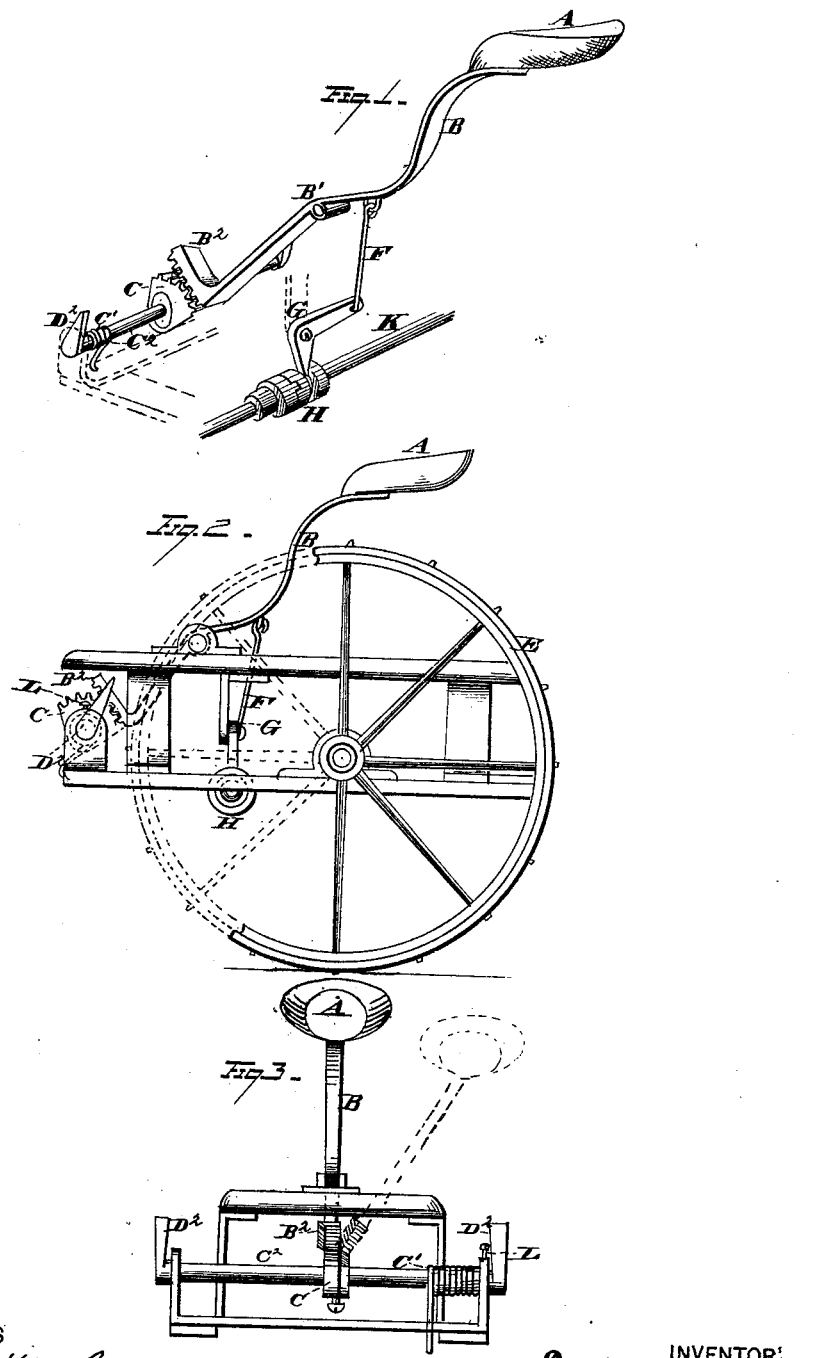

SAMUEL DYER AND MULLINGS DYER, OF MANSFIELD, OHIO.

IMPROVEMENT IN HARVESTERS.

Specification forming part of Letters Patent No. 196,570, dated October 30, 1877; application filed July 25, 1877.

*To all whom it may concern:*

Be it known that we, SAMUEL DYER and MULLINGS DYER, of Mansfield, in the county of Richland and State of Ohio, have invented certain new and useful Improvements in Safety Attachments for Mowers, Reapers, &c.; and we do hereby declare the following to be a full, clear, and exact description of the invention, such as will enable others skilled in the art to which it pertains to make and use it, reference being had to the accompanying drawings, which form part of this specification.

Our invention relates to improvements in harvesters, mowers, and reapers; and consists in a safety attachment, whereby if the driver should leave his seat or be thrown therefrom, the brake will be applied to the wheels, and the cutter-bar thrown out of gear and action.

In the drawings, Figure 1 is a detached view of the parts constituting our invention; Fig. 2, a view of the same as applied to a mower or reaper. Fig. 3 is a demonstrative view of the gear-connection between the seat-lever and wheel-brake.

A is the driver's seat. B (its standard) is a lever pivoted or journaled to the frame of the machine at $B^1$, and terminating in the segment-gear $B^2$. This segment-gear is of a double or compound character, adapted to operate as a miter-gear or as line-gearing, as shown in Fig. 3 of the drawings. By this method of forming the gearing it is equally adaptable to a seat placed between the wheels, or to a seat placed upon one side of the machine. In the first place the gearing is united after the fashion of line-gearing, and in the second place it is joined as miter-gearing.

C is a gear-wheel or segment-gear of a character corresponding to the segment-gear $B^2$. The gear C is attached to and operates the shaft $C^2$, to one or both ends of which is attached any suitable brake or stopping apparatus for the wheels of the machine. In the present instance a dog, $D^2$, is employed, which, by impinging against the spuds or sprockets of the wheels E, effectually prevents their forward motion. Between the pivot $B^1$ and the seat A is attached a link, F, connecting the seat-standard B with the bell-crank G, which is attached to the frame of the machine in any suitable manner. The bell-crank G is made, in any suitable manner, to engage with any suitable clutch-gear, H, placed upon the primary shaft of the mechanism driving the cutter-bar. As shown in the present instance, K is the said primary shaft, upon which the clutch-gear H is placed, that part of which engaging with the bell-crank G being made movable longitudinally upon the shaft K.

$C^1$ is a spring, whose tendency of operation is to apply the brakes D and uncouple the clutch-gear H. This spring may have various equivalents and modifications—as, for instance, an upward-pushing spring beneath the seat A or standard B, which would perform exactly the same office as the spring $C^1$.

L is a pin passing through the frame of the machine into a hole made on the shaft $C^2$, at such an angle across its axis as that when the pin is driven through, it shall operate to retain the brake in its unlocked position independent of any weight placed upon the seat A.

It is obvious that with the weight of the driver upon the seat A, the clutch-gear H will be coupled, so that a forward movement of the machine will operate the cutter-bar, and also the brakes $D^2$ will be unlocked and the wheels E left free to turn; and it is equally obvious that were the driver to leave or be thrown from the seat A the spring $C^1$ would immediately act to apply the brakes $D^2$, and at the same time to uncouple the clutch-gear H, and stop the motion of the cutter-bar.

If, for any reason, it is desired to retain the brakes $D^2$ in the unlocked position, and the clutch H in its uncoupled position, the pin L may be applied to produce this result.

We do not limit ourselves to the precise construction and adaptation of parts to the machine as herein shown, as machines of various patterns and styles would demand more or less variation in shape and adjustment of the parts hereinbefore described.

What we claim is—

1. In combination with the driver's seat of a reaper, mower, or harvester, suitable connections with wheel-brakes and the cutter-bar gearing, whereby the brakes will be applied and the cutter-bar stopped immediately upon the driver leaving or being thrown from the said seat, substantially as and for the purposes described.

2. A reaper, mower, or harvester seat the stem or standard of which is a lever fulcrumed upon the frame of the machine, and constructed and arranged to operate simultaneously the wheel-brakes and any suitable device for throwing the cutter-bar into or out of motion, substantially as described.

3. In combination with the lever or seat-standard B, the gear-connection B² C and the brake-connecting mechanism, substantially as and for the purposes described.

4. The combination of driver's seat A, seat-standard B, and wheel-brakes, substantially as and for the purposes described.

5. In a safety brake attachment, the two gears respectively formed on the seat-standard and brake-shaft, and adapted to relatively engage as either line or miter gearing, substantially as described.

In testimony whereof we have signed our names to this specification in the presence of two subscribing witnesses.

SAMUEL DYER.
MULLINGS DYER.

Witnesses:
A. J. TWITCHELL,
W. T. BLISS.